(12) United States Patent
Kim

(10) Patent No.: US 6,174,436 B1
(45) Date of Patent: Jan. 16, 2001

(54) IRRIGATION TYPE OIL SKIMMER AND METHOD FOR SKIMMING OIL

(76) Inventor: Bok Joong Kim, Samsung-yeonlip ga-105, 763-3, Mok-4-dong, Yangchun-Ku, Seoul 154-054 (KR)

( * ) Notice: Under 35 U.S.C. 154(b), the term of this patent shall be extended for 0 days.

(21) Appl. No.: 09/242,118

(22) PCT Filed: Jun. 10, 1998

(86) PCT No.: PCT/KR98/00152
§ 371 Date: Feb. 10, 1999
§ 102(e) Date: Feb. 10, 1999

(87) PCT Pub. No.: WO98/57846
PCT Pub. Date: Dec. 23, 1998

(51) Int. Cl.[7] ............... E02B 15/04; B63B 35/32
(52) U.S. Cl. .................... 210/242.3; 210/923
(58) Field of Search ................ 210/170, 747, 210/776, 242.1, 242.3, 538, 923

(56) References Cited

U.S. PATENT DOCUMENTS

| | | | |
|---|---|---|---|
| 3,623,609 | * 11/1971 | Ainlay | 210/242.3 |
| 3,731,813 | * 5/1973 | Tipton | 210/242.3 |
| 3,785,496 | * 1/1974 | Smith, Jr. | 210/242.3 |
| 5,030,363 | * 7/1991 | Pole | 210/923 |
| 5,043,064 | * 8/1991 | Abell et al. | 210/923 |

FOREIGN PATENT DOCUMENTS

| | | |
|---|---|---|
| 821602 | 7/1982 | (KR). |
| 0161609 | 12/1998 | (KR). |

OTHER PUBLICATIONS

Bibliographical Particulars of KR 82–1602 of Jul. 1982.
Bibliographical Particulars of KR 0,161,609 of Dec. 1998.

* cited by examiner

*Primary Examiner*—David A. Simmons
*Assistant Examiner*—Frank M. Lawrence
(74) *Attorney, Agent, or Firm*—Ladas & Parry

(57) ABSTRACT

An oil skimmer has a lower hull capable of floating and submerging and capable of discharging sea water through an opening to thicken a layer of oil. An oil drawing device in the form of a water wheel is installed on the deck of the lower hull for conveying an oil layer on the sea surface to a central tank when the lower hull is submerged. A main floater provides a floating force for the deck and has a guide path partly communicating with the central tank. An oil separating/extracting device is supported at a level above the water wheel of the oil drawing device for separating an upper oil layer in the central tank and transferring the oil through the guide path into an oil collecting tank.

7 Claims, 5 Drawing Sheets

IRRIGATION TYPE OIL SKIMMER AND METHOD FOR SKIMMING OIL

TECHNICAL FIELD

The present invention relates to an irrigation type oil skimmer and a method for skimming oil. More specifically, the present invention relates to an irrigation type oil skimmer and a method for skimming oil, in which an oil drawing means and an oil separating/extracting means are installed on a floating/submerging type hull, and a main floater is installed on the top of the hull to provide floatation, thereby forming an all-weather type oil skimmer.

BACKGROUND ART

Recently, accidents of large ships (particularly oil tankers) at sea are becoming more frequent and spillage of oils raises alarming concern for the natural environment. Consequently, the oil spills drift toward the coasts, killing various natural wild life at sea, incurring enormous property loss.

Further, when removing the oil spills, chemicals are frequently used. As a result, the oil spills are only emulsified or are made to sink to the sea bottom, so that only the visible oil spills are removed, and no attempt has been made for the complete removal.

In order to overcome this disadvantage, Korean Utility Model Publication No. 82-1602 was proposed. In this proposal, a spiral rotor which has a spiral form side view and freely rotatable is installed on a frame in the longitudinal direction, and a driving means is installed for driving the spiral rotor, with its opening directed forward. Further, rotary vanes are installed on the frame, with the lower portion of the vane submerged into the sea water. In order to drive the rotary vanes, a driving gear is meshed with an annular rack.

However, in this apparatus, a drum with a plurality of brushes attached thereon is installed at an upstream of the spiral rotor. Further, a scrubbing roller removes the oils adhered to the brushes. However, the drum cannot be made to revolve fast due to the viscosity of the oils. As a result, the oils cannot be removed in a speedy manner. Further, there is no means for handling the water adhered to the oil, thus increasing the recovered amount (mixture of water and oil), making it necessary to have a large storage tank. As a result, the amount of actual recovered in the storage tank is relatively small.

In an attempt to overcome this disadvantage, an oil recovering ship was proposed by the present applicant under Korean Patent Application No. 95-32192. This oil recovering ship comprises: a hull having a plurality of partitioned tanks, each having floating force; an oil introducing means installed on the front part of the hull, for introducing the oil from the sea into the ship; and an oil drawing means installed on the tail part of the hull, for drawing the introduced oil.

This oil recovering ship further comprises: an oil separating/extracting means installed at the rear of the oil drawing means, for separating/extracting/recovering the drawn oil; and an adjusting means for adjusting the height of the oil drawing means and the oil separating/extracting means.

The oil drawing means consists of a water wheel having a plurality of blades, being forcibly rotatable.

However, this oil recovering ship is only capable of simply carrying out the recovering task, and therefore, a towboat is required to pull the ship to the site of an oil spill. Therefore, in an emergency, the oil recovering ship cannot be mobilized in a speedy manner.

SUMMARY OF THE INVENTION

The present invention is intended to overcome the above described disadvantages of the conventional techniques.

Therefore it is an object of the present invention to provide an irrigation type oil skimmer and a method for skimming oils, in which the oil is carried to and accumulated at a central tank to become a thickened layer, and then, the upper layer of oil is separated and recovered.

In achieving the above object, the irrigation type oil skimmer according to the present invention is characterized in that an upper hull raises, separates, and extracts the oil, being supported by a lower hull; the lower hull being capable of floating/submerging, while afloat, the lower hull enables the skimmer for speedy mobilization, and while submerged, the lower hull enables the upper hull to draw, separate and extract the oil.

That is, the irrigation type oil skimmer according to the present invention comprises: a lower hull capable of floating and submerging, and further capable of discharging the sea water through an opening to thicken the oil layer; an oil drawing means having a shape of a water wheel, installed on the deck of the lower hull, for drawing an oil layer from the sea surface toward a central tank when the lower hull is submerged; a main floater for providing a floating force to the deck, and having a guide path partly communicating with the central tank; and an oil separating/extracting means having a shaft at a level higher than that of the water wheel of the oil drawing means, for separating the upper oil layer of the central tank and outputting the oil through the guide path into an oil collecting tank.

In accordance with another aspect of the present invention, the method for skimming oils comprises the steps of: retrieving an oil layer at the sea level together with the sea water toward a central tank having a certain space (first step); sinking and discharging the sea water through the opening at the bottom, and floating the oil by the help of the floating force to thicken oil layer (second step); and outputting only the surface oil to a water wheel to separate and extract the oil from the residual sea water (third step).

BRIEF DESCRIPTION OF DRAWINGS

The above object and other advantages of the present invention will become more apparent by describing in detail the preferred embodiment of the present invention with reference to the attached drawings in which.

DETAILED DESCRIPTION OF THE BEST MODE FOR CARRING OUT THE INVENTION

Figure 1:
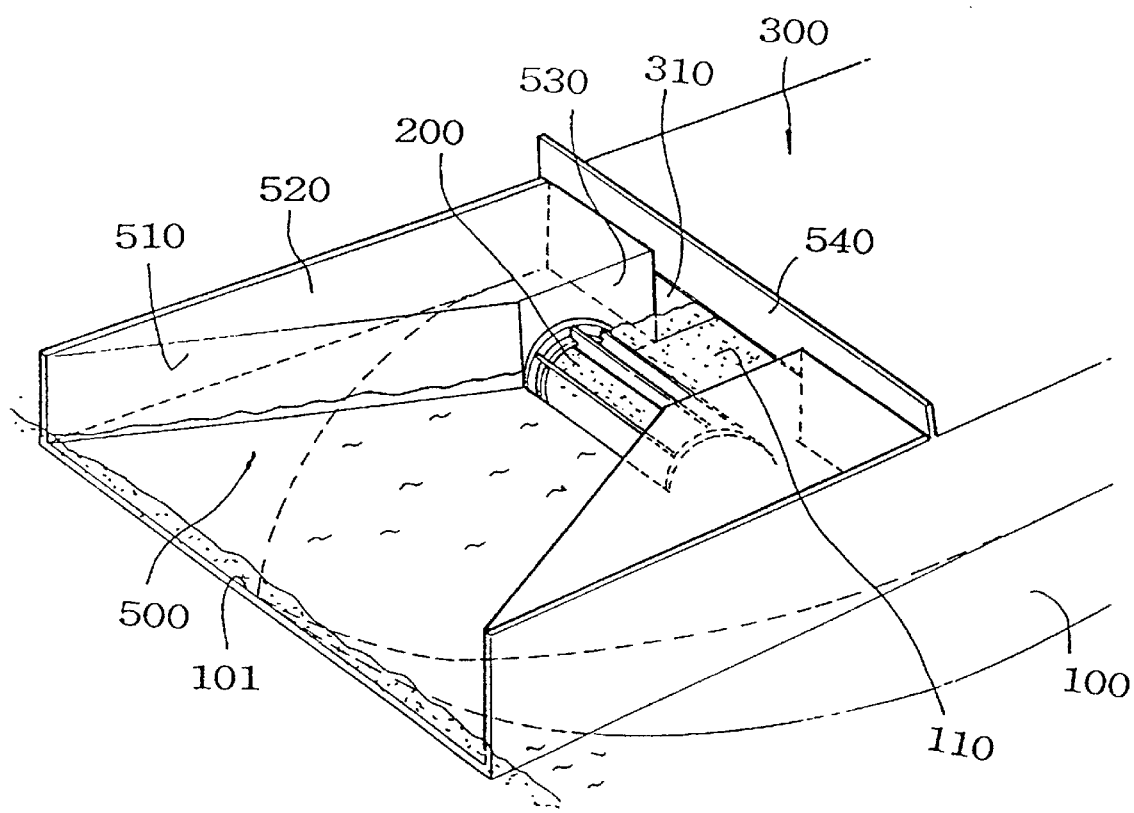
FIG. 1 is a perspective view of a part of the skimmer according to the present invention.

FIG. 1 is a perspective view of a part of the irrigation type oil skimmer according to the present invention. The oil skimmer according to the present invention takes the form of conventional ships. The skimmer comprises: a lower hull 100 having a central tank 110 formed in the lengthwise direction of the lower hull, and an oil drawing means 200; an oil guiding means 500 for guiding the oil along with the sea water over the top of the bow of the lower hull 100 by the activation of the oil drawing means 200; and a main floater 300 having a guiding path 310 communicating with the central tank 110, and accommodating a floater means 311 (FIG. 3) covering the lower hull.

The oil guiding means 500 forms a deck 101 of the bow of the lower hull 100, and floating spaces 520 having guiding walls 510 for guiding the oil and water to the oil drawing means 200 are installed on both sides of the deck 101. Preferably, the floating spaces 520 have reverse flow preventing walls 530 for blocking the reverse flow of the oil by being formed on both sides of the oil drawing means 200 and being in parallel with the guiding path 310 of the main floater 300.

Reference numeral 540 indicates a blocking wall for blocking the overflow of the sea waves into a cabin (not illustrated), built upon the main floater 300. The level of the oil or sea water over the deck 101 indicates the sea level when the lower hull 100 is submerged.

Figure 2:
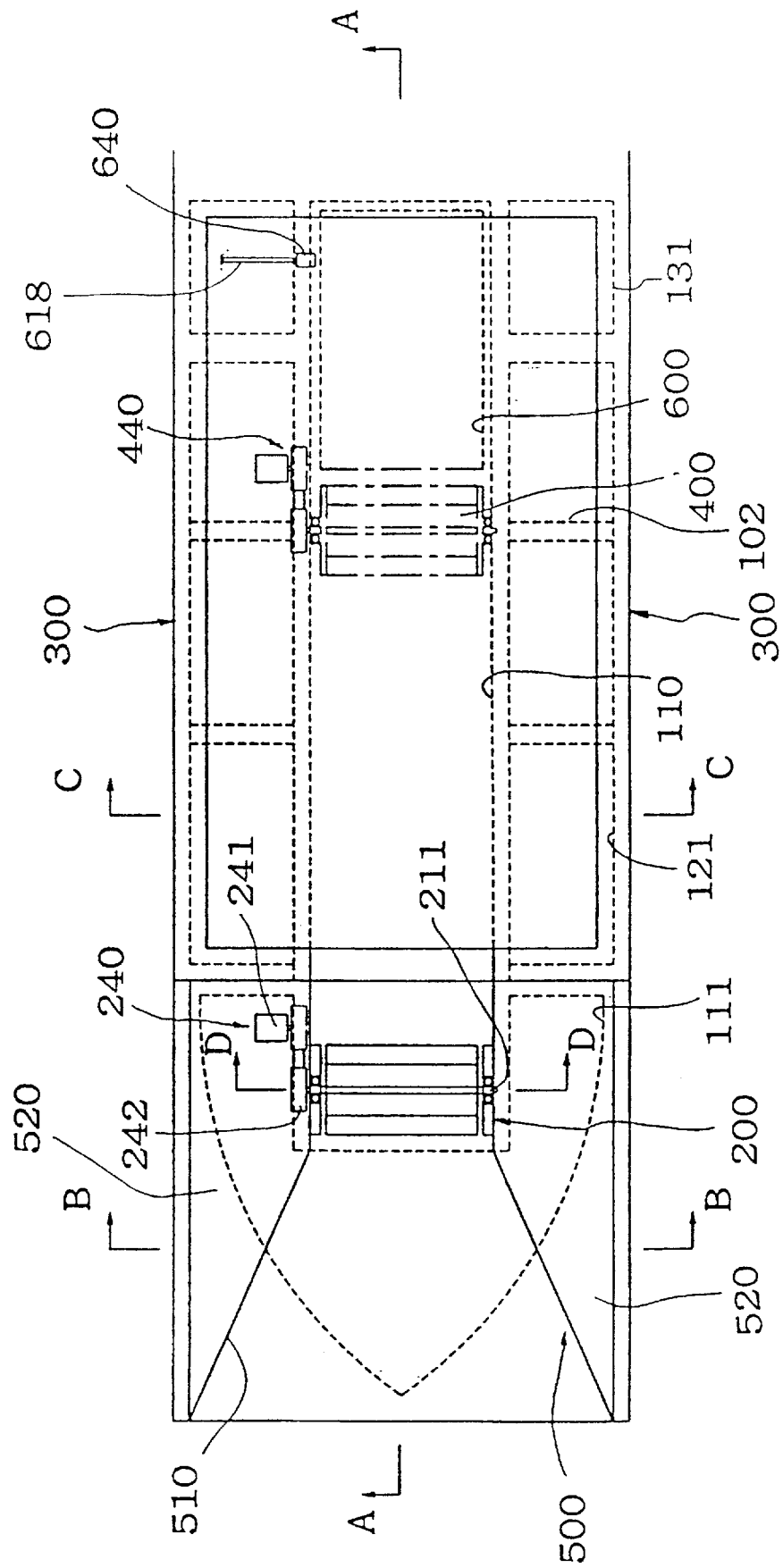
FIG. 2 is a plan view of the skimmer according to the present invention.
Figure 3:
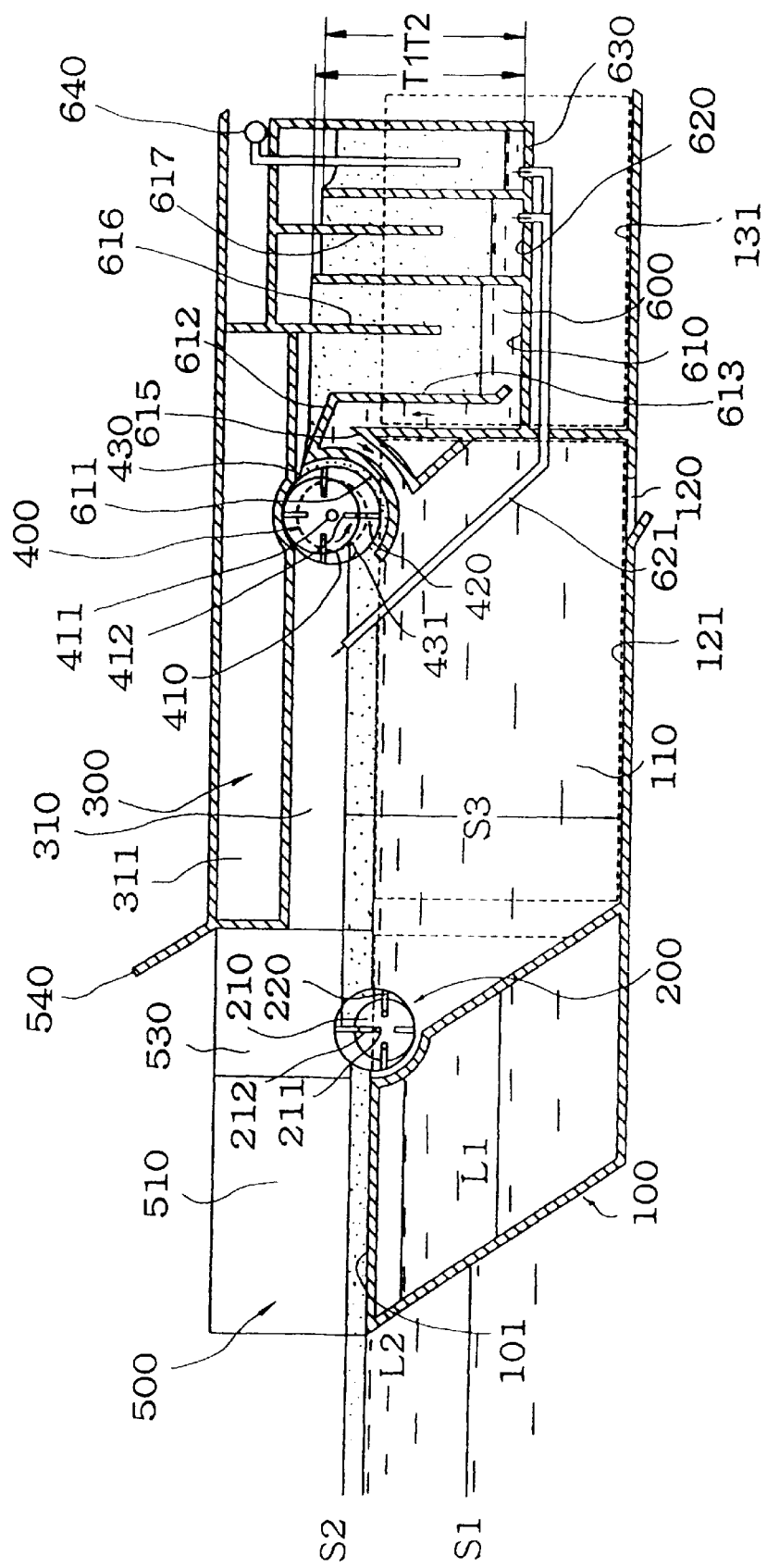
FIG. 3 is a sectional view taken along a line A—A of FIG. 2.

FIG. 2 is a plan view of the essential parts of the skimmer according to the present invention. As shown in this drawing, the oil guiding means 500 and the oil drawing means 200 are installed at the bow of the lower hull 100, an oil separating/extracting means 400 is installed on the lower hull 100 at a distance from the oil drawing means 200. Between the oil drawing means 200 and the oil separating/extracting means 400, the central tank 110 with an opening at the bottom is installed. The central tank 110 and the main floater 300 laterally cover the width of the lower hull 100. The main floater 300 incorporates the guiding path 310 as shown in FIG. 3.

Each of the oil drawing means 200 and the oil separating/extracting means 400 comprises: a drum 210 or 410 eccentrically rotated by an eccentric shaft 211 or 411; a plurality of blades 220 or 420 having different heights extend around the drum 210 or 410 in radial directions; a concentric groove 231 or 431 for concentrically rotating the blades 220 or 420 regardless of the eccentric rotation of the drum 210 or 410; a pair of drum eccentric shaft retaining plates 230 or 430 for retaining the eccentric shaft 211 or 411; and a driving means 240 or 440 comprising a motor 241 and a pulley 242 for supplying a driving force to the eccentric shaft 211 or 411.

At the stern of the lower hull 100 and at the rear of the oil separating/extracting means 400, there is formed an oil collecting tank 600. In the lower hull 100 and at the front of the central tank 110, there is formed a first float adjusting tank 111. At both sides of tank 110, there are formed second float adjusting tanks 121. At the rear of tank 110, there is formed a third float adjusting tank 131. Between the respective adjusting tanks 111, 121 and 131, there are formed isolating walls 102, so that the floating height can be conveniently adjusted in an emergency.

Reference numeral 618 indicates an oil transferring tube for transferring the recovered oil to an oil tanker (not illustrated). Reference numeral 510 indicates a guide wall, formed by the float space 520, while a blocking wall 540 is formed in the float space 520, at a position corresponding to the oil drawing means 200.

FIG. 3 is a sectional view taken along line A—A in FIG. 2. In the bow portion of the lower hull 100, the first float adjusting tank 111 is formed. The second float adjusting tanks 121 are formed in the intermediate portion. In the stern portion, the third float adjusting tank 131 is formed. The second float adjusting tanks 121 are divided into two by the central tank 110 in the lengthwise direction. At the middle portion of the bow, i.e., at the middle portion of the first float adjusting tank 111, the oil drawing means 200 is installed, which partly submerges into the water during the skimming operation. The oil separating/extracting means 400 is installed at the rear of the central tank 110, for transferring the accumulated thick oil layer into the oil collecting tank 600. The oil guiding means 500 is installed at the bow of the lower hull 100.

Reference numeral 540 indicates a blocking wall for blocking water waves.

The main floater 300 installed at the central tank 110, the oil separating/extracting means 400, and the oil collecting tank 600 provide the floating force for the hull. The main floater 300 has the guide path 310, and has the same width as the central tank 110. Preferably, the main floater 300 should have a height to provide a sufficient space above the collected oil of the central tank 110.

The oil collecting tank 600 comprises: an arcuate portion 611 installed under the drum 410 creating a small gap at the tips of the turning blades 420 of the oil separating/extracting means 400; an inclined guide face 612 integrally formed with the arcuate portion 611, for guiding the collected oil into a first oil collecting tank 610; an isolating wall 613 integrally formed with the bottom of the guiding face 612, for dividing the oil collecting tank 600 into two, with the collected oil being positioned above and water below; and the first oil collecting tank 610 having a sea water discharge face 615 extended beneath the guiding face, for guiding the sea water into the central tank 110.

The first oil collecting tank 610 should have a height T1 higher than the level S3 of the central tank 110. This ensures that, when the sea water sinks below the oil layer within the central tank 110 owing to the difference in the specific gravities of the oil and the sea water, an adquate water pressure is provided to make the sea water in the oil collecting tank 600 flow through the discharge face 615 into the central tank 110.

After the first oil collecting tank 610, the heights of the second oil collecting tank 620 and the third oil collecting tank 630 are made successively lower, to naturally overflow the sea water.

Preferably, the height T2 of the second oil collecting tank 620 should be the same height or slightly higher than the level S3 of the central tank 110. Preferably, a draining path 621 is formed on the bottom of the second oil collecting tank 620, for draining the separated sea water. The draining path 621 should be as high as the level of the central tank 110 or slightly higher. However, it should be lower than the height T2 of the second oil collecting tank 620 to prevent the reverse flow of the water.

Reference numeral 640 indicates a motor for discharging the collected oil.

Figure 4:
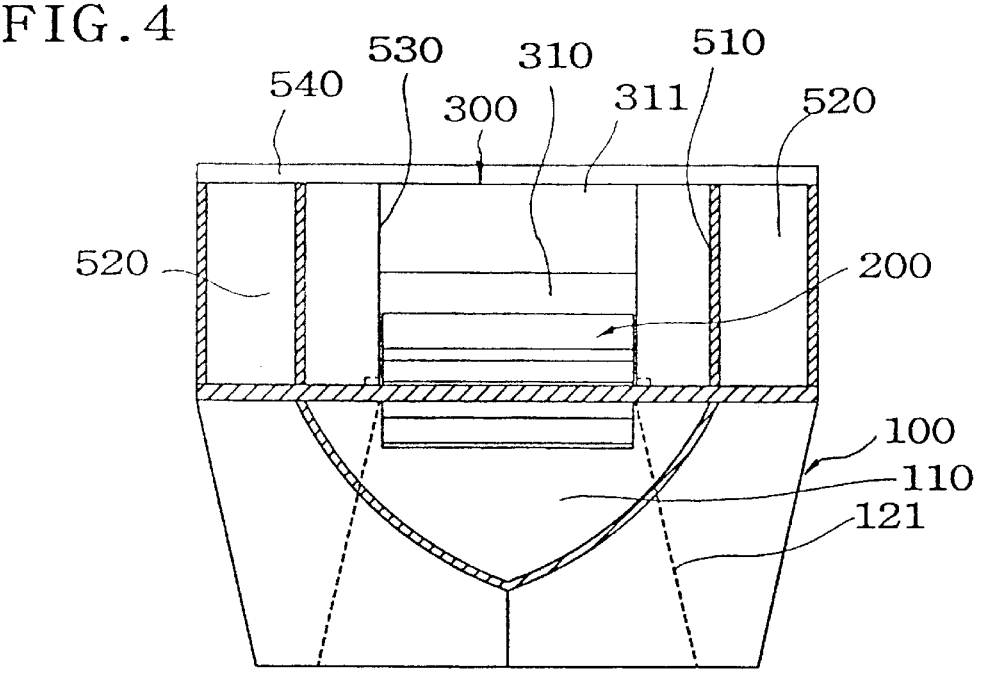
FIG. 4 is a sectional view taken along a line B—B of FIG. 2.

FIG. 4 is a sectional view taken along line B—B of FIG. 2. As shown in the drawing, the oil skimmer comprises: a lower hull 100 having the central tank 110 in the middle, and the second float adjusting tanks 121 formed at both sides of the central tank 110; an oil drawing means 200 disposed on the front portion of the central tank 110; and a main floater 300 having the guide path 310 extending above the central tank 110. The main floater 300 may be filled with a foamed resin but is not limited to this material, while its outside may be covered with wood or plastic sheets on a frame (not shown).

Figure 5:
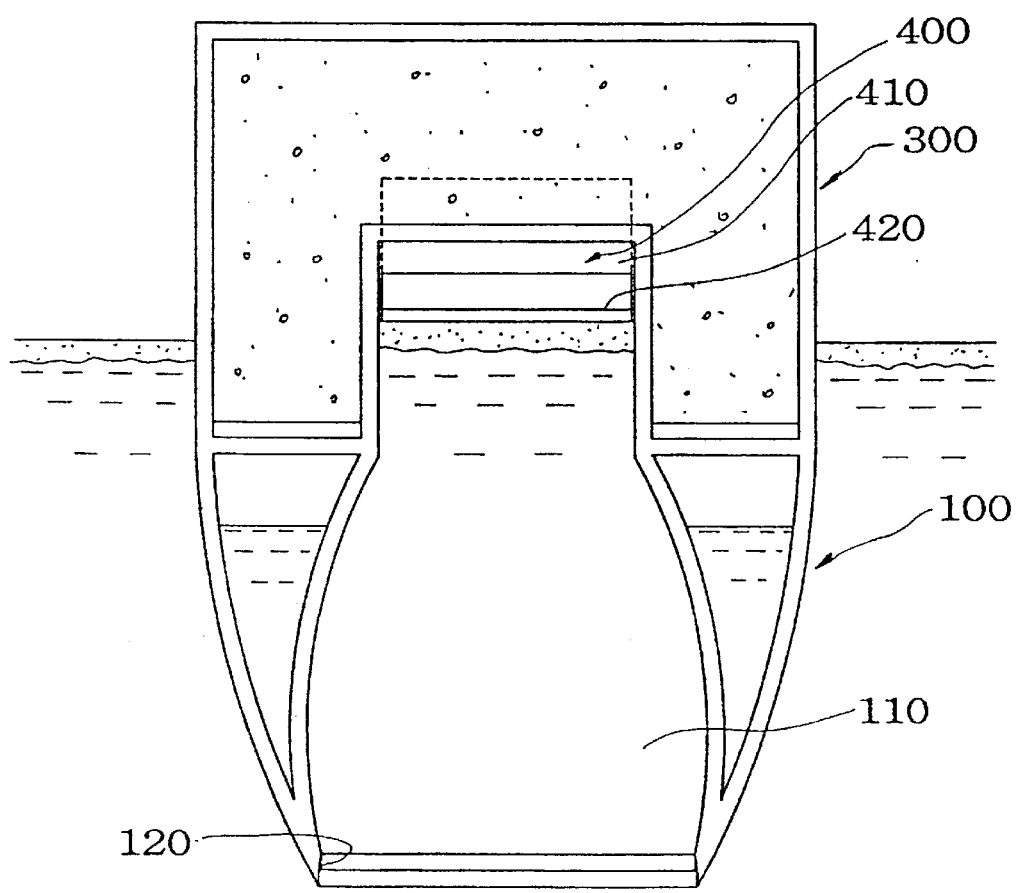
FIG. 5 is a sectional view taken along a line C—C of FIG. 2.

FIG. 5 is a sectional view taken along line C—C of FIG. 2. As shown in this drawing, the oil skimmer comprises: the central tank 110 formed at the center of the lower hull 100; the second float adjusting tanks 121 formed at both sides of the central tank 110; and an opening 120 formed at the bottom of the central tank 110. The main floater 300 is formed on the lower hull 100, and a guiding path 310 is formed under the main floater 300 and on the central tank 110. The oil separating/extracting means 400 is installed on the lower hull 100 where the guiding path 310 ends. Depending on varying needs, the oil separating/extracting means 400 may be installed on the frame of the main floater 300.

Figure 6:
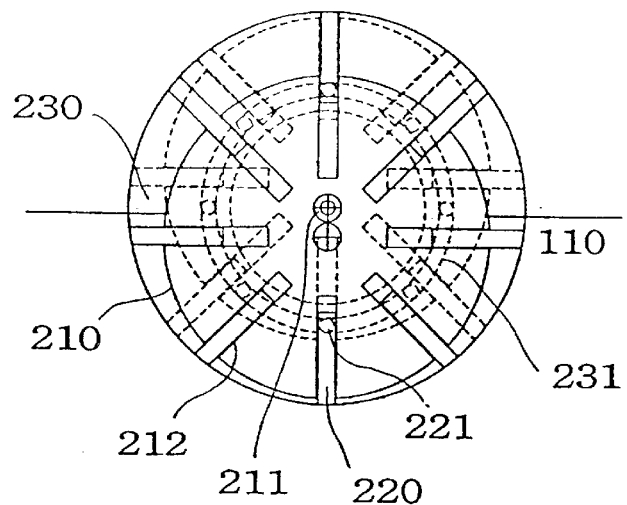
FIG. 6 is a side view showing the structure of the oil drawing means of the present invention.

FIG. 6 is a side view showing the structure of the oil drawing means 200 and the oil separating/extracting means 400 of the present invention. Here, only the oil drawing means 200 will be described. The oil drawing means 200 according to the present invention comprises: a drum 210 having radially arranged blade channels 212 for being rotated eccentrically by an eccentric shaft 211; a pair of drum eccentric shaft retaining plates 230 each having a revolving track having a diameter larger than that of the drum 210, for retaining the eccentric shaft 211, and having a concentric groove 231 concentric to the eccentric shaft 211; and blades 220 each settled in the blade channel 212 and each having a pair of guide protuberances 221 for being guided along the concentric grooves 231.

Figure 7:
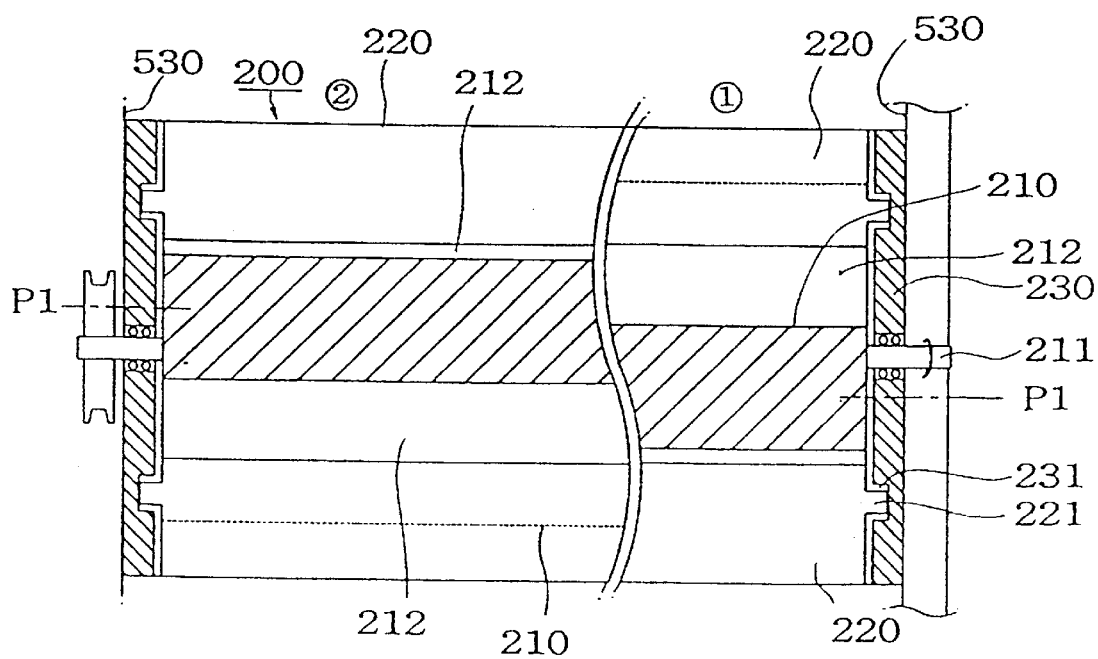
FIG. 7 is a longitudinal sectional view of FIG. 6.

FIG. 7 is a longitudinal sectional view of FIG. 6.

Here, the blades 220 are settled into the blade channels 212 of the drum 210 around the axis P1 in radial directions, and the blades 220 are turned around the eccentric shaft 211. Each of drum eccentric shaft retaining plates 230 has a revolving track having a diameter larger than that of the drum 210, for retaining the eccentric shaft 211, and has a concentric groove 231 concentric to the eccentric shaft 211. The retaining plates 230 are preferably fixed to the lower hull 100.

In FIG. 7, the position (1) corresponds to that of FIG. 6 with the solid line, while the position (2) corresponds to that of FIG. 6 with the dotted line.

Operations of the oil skimmer according to the present invention will now be described hereinafter.

As shown in FIGS. 1 to 3, when the oil skimmer moved to the emergency region, air is filled into the first to third float adjusting tanks 111, 121 and 131, so that the internal water level descends to the position L1. Then the lower hull is lifted up to the sea level S1. At this position, the water resistance decreases, and the oil skimmer can move as fast as ordinary ships (In the drawing, the skimmer propulsion means is omitted.). When the skimmer arrives at the oil spilled region, the first to third float adjusting tanks 111, 121 and 131 are filled with water up to the level L2, so that the lower hull 100 is submerged to sea level S2. The oil spill together with the sea water is naturally guided to the oil drawing means 200.

In this case, as shown in FIG. 1, the sea water is guided through the guiding walls 510 into the oil drawing means 200 without encountering much resistance. In this state, the oil drawing means 200 is activated so that the sea water mixed with the oil can be guided into the central tank 110. Such a guiding will be made possible by the 180-degree rotation of the drum 210 from the dotted line position (the position ② in FIG. 7) to the solid line position (the position ① in FIG. 7) as can be seen in FIGS. 6 and 7.

For example, the lowermost blade 220 of the drum 210 (dotted line position "a"), which is settled within the blade channel 212, turns to the uppermost position of the drum 210 (solid line position "b"). During this period, the blade 220 maintains an extended position with the guiding protuberance 221 of the blade 220 inserted into the concentric groove 231. Thus at the position ① (the solid line of FIG. 6) of FIG. 7, the blade 220 maintains the maximally exposed state. Therefore, the mixture of the sea water and oil which lies on the level S2 is continuously moved from the left side to the right side in FIG. 6 i.e., into the central tank 110, with the blades 220 serving as transferring means.

In this case, the blades 220 move along the concentric groove 231, while the drum 210 eccentrically revolves without being loaded with an extra load. Thus the eccentric revolution of drums with blades are repeated, and the oil is continuously pumped. The driving power for the drum 210 can be reduced because of no extra load. In the central tank, the sea water which is discharged through the bottom opening 120 is kept smaller than the incoming oil-water mixture, so that a level S3 can be kept higher than the existing level S2. If the level S3 of the tank 110 is higher than the existing level S2, the relative water pressure increases, and, therefore, the sea water can be continuously discharged through opening 120. As a result, the oil layer within the tank 110 becomes thicker.

In this case, the size of the opening 120 is determined by taking into account the revolution speed of the oil drawing means 200 and the size of the blades 220.

The oil separating/extracting means 400 has the same structure as that of the oil drawing means 200. However, in this means, the eccentric shaft 411 is positioned higher than the eccentric shaft 211 of the oil drawing means 200. Further, the lowermost blade 420 of the drum 410 makes contact with the oil layer, so that the blade can carry the oil into the oil collecting tank 600. In this case, because the blades 420 moves along the arcuate portion 611, the oil also moves along the arcuate portion 611 into the first oil collecting tank 610. The carried oil contains the sea water, and the sea water sinks down due to the difference of the specific gravities. The sunk sea water is guided along the isolating wall 613 to be fedback into the central tank 110 from which the sea water is discharged through the opening 120. Within the first and second oil collecting tanks 610 and 620, circulation plates 616 and 617 are suspended which delay the flow of the oil and water to thoroughly separate the water from the oil.

Since the height t1 of the first oil collecting tank 610 is higher than the level S3 of the central tank 110, the higher water pressure acts to naturally discharge the separated sea water. The sea water discharge face (plate) 615 should be as high as the first oil collecting tank 610. Thus if the oil level of the first oil collecting tank 610 becomes too high, the oil overflows into the second oil collecting tank 620. The second oil collecting tank 620 has a height T2 which is higher than that of the central tank 110 and lower than that of the first tank 610. Thus a water pressure is formed, and the sea water sinks to the bottom of the tank to be discharged through the draining path 621. Preferably, the draining path 621 should be as high as the level of the central tank 110. Thus owing to the water pressure, the sea water is discharged into the central tank 110, and the reverse flow of the sea water from the central tank 110 to the oil collecting tank 600 is prevented. The oil thus collected in the second tank 620 overflows into the third oil collecting tank 630. Finally the oil in the third tank 630 is sent through conduit 618 to an oil storage tank or to an oil tanker (not illustrated).

The present invention described above will not be limited to the specific embodiment and the drawings, but it will be apparent to those ordinarily skilled in the art that various changes and modifications can be made without departing from the scope of the present invention as defined in the appended claims.

According to the present invention as described above, there are provided a liftable/submergeable lower hull, with an oil drawing means, an oil separating/extracting means, a central tank and oil collecting tanks provided therein and thereon. Further, a main floater is provided. Thus when the skimmer moves toward the site of an oil spill, the lower hull is lifted, so that the skimmer can be moved quickly. When the skimmer arrives at the site, it is submerged to introduce the oil layer into the skimmer. Therefore, its mobilization and operation are very quick and efficient. Further, since the lower hull is submerged to draw the oil so as to carry out the operation at the sea level, the water pumping energy can be conserved. The water is separated from the oil by utilizing the difference of the specific gravities, and the oil layer is made to thicken. Therefore, the oil recovery becomes a speedy process. Further, several oil collecting tanks are installed to purify the recovered oil, therefore improving the oil purity. Further, owing to the main floater, the oil recovering operation can be carried out under all weather conditions.

What is claimed is:

1. An oil skimmer comprising:
    a lower hull capable of floating and submerging, and capable of discharging sea water through an opening so as to thicken a layer of oil;
    an oil drawing means having a shape of a water wheel installed on a deck of said lower hull, for drawing an oil layer on a sea surface toward a central tank when said lower hull is submerged;
    a main floater for applying a floating force to said deck, and having a guide path partly communicating with said central tank; and
    an oil separating/extracting means having a shaft at a level higher than that of said water wheel of said oil drawing means, for separating an upper oil layer in said central tank and sending oil through a guide path into an oil collecting tank.

2. The oil skimmer as claimed in claim 1, wherein said oil drawing means comprises:
    a drum eccentrically rotated by an eccentric shaft; a plurality of blades installed around said drum in radial directions; and
    a pair of eccentric shaft retaining plates for retaining said eccentric shaft, each of said retaining plates having a concentric groove for concentrically turning said blades regardless of eccentric rotations of said drum.

3. The oil skimmer as claimed in claim 1, wherein a pair of guiding walls are installed at a front of said oil drawing means, and a reverse flow blocking wall is installed between said guiding walls and said guiding path to prevent a reverse flow of the oil layer in the central tank into sea.

4. The oil skimmer as claimed in claim 2, said oil collecting tank comprising:
    an arcuate portion installed under said drum having a small gap with tips of said blades of said oil separating/extracting means;
    an inclined guide face integral with said arcuate portion, for guiding collected oil into said oil collecting tank;
    an isolating wall formed integrally with a bottom of said guiding face, for dividing said oil collecting tank so that the collected oil is positioned above and sea water below; and
    said oil collecting tank having a sea water discharge face extended beneath said guiding face, for guiding sea water into said central tank, said collecting tank having a height higher than that of said central tank.

5. The oil skimmer as claimed in claim 4, comprising suspended circulation plates in said collecting tank for delaying oil and water to obtain more thorough separation.

6. The oil skimmer as claimed in claim 4, wherein said oil collecting tank includes first and second successive oil collecting tanks; said second oil collecting tank has a height higher than that of said first oil collecting tank; and a draining path is installed at a bottom of said second oil collecting tank, said draining path having a leading end at a level at least as high as a level of said central tank.

7. The oil skimmer as claimed in claim 1, wherein said oil collecting tank includes first, second and third oil collecting tanks connected in succession for progressive separation of oil from sea water, said third oil collecting tank being connected for discharge of oil from the skimmer.

* * * * *